(12) United States Patent
Mendonca et al.

(10) Patent No.: US 8,533,828 B2
(45) Date of Patent: Sep. 10, 2013

(54) SYSTEM FOR PROTECTING SECURITY OF A PROVISIONABLE NETWORK

(75) Inventors: John Mendonca, Redwood City, CA (US); Amit Raikar, Sunnyvale, CA (US); Bryan Stephenson, Alviso, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2391 days.

(21) Appl. No.: 10/349,385

(22) Filed: Jan. 21, 2003

(65) Prior Publication Data

US 2004/0143759 A1 Jul. 22, 2004

(51) Int. Cl.
*H04L 29/06* (2006.01)

(52) U.S. Cl.
USPC .............................. 726/23; 709/226; 709/229

(58) Field of Classification Search
USPC .................... 726/22–25; 713/189, 193–194; 709/223–226
See application file for complete search history.

(56) References Cited

U.S. PATENT DOCUMENTS

| | | | | |
|---|---|---|---|---|
| 5,991,881 A | * | 11/1999 | Conklin et al. | 726/22 |
| 6,735,701 B1 | * | 5/2004 | Jacobson | 726/1 |
| 6,988,208 B2 | * | 1/2006 | Hrabik et al. | 726/23 |
| 2002/0004390 A1 | * | 1/2002 | Cutaia et al. | 455/424 |
| 2002/0178383 A1 | | 11/2002 | Hrabik et al. | |
| 2003/0110392 A1 | * | 6/2003 | Aucsmith et al. | 713/200 |
| 2003/0117280 A1 | * | 6/2003 | Prehn | 340/540 |
| 2006/0036719 A1 | * | 2/2006 | Bodin et al. | 709/223 |

OTHER PUBLICATIONS

Balasubramaniyan et al. "An architecture for Instrusion Detection using Autonomous Agents", Jun. 11, 1998, Purdue University, pp. 1-12.*

Schneier, Bruce "Managed Security Monitoring: Network Security for the 21st Century", Copyright 2001, Counterpane Internet Security, Inc.*

Network Magazine, "Building a Dynamic Utility Data Center" Sep. 2002.

Network Magazine, "Building a Dynamic Utility Data Center", Sep. 2002.

* cited by examiner

*Primary Examiner* — Mohammad L Rahman

(57) ABSTRACT

Disclosed is a system for protecting security of a provisionable network, comprising: a network server, a network client communicatively coupled with the server, a pool of resources coupled with the server for employment by the client, a resource management system for managing the resources, and an intrusion detection system enabled to detect and respond to an intrusion in said network.

22 Claims, 3 Drawing Sheets

SYSTEM FOR PROTECTING SECURITY OF A PROVISIONABLE NETWORK

RELATED U.S. APPLICATION

This application incorporates herein by reference the co-pending patent application, application number 10/349,423, entitled "A Method For Protecting Security Of Network Intrusion Detection Sensors," filed concurrently herewith on Jan. 21, 2003, and assigned to the assignee of the present application.

FIELD OF THE INVENTION

The present invention relates to the field of computer network security. Specifically, the present invention relates to a method and architecture for providing security to a provisionable utility data center.

BACKGROUND OF THE INVENTION

Modern networking continues to provide communication and information access increases and improvements. The continuing growth of networking systems and technology seems limitless and the speed of networked communications has brought benefits to nearly every human endeavor.

Recent trends in information technology have seen large enterprises and other users moving towards a new paradigm of network utilization, the provisionable utility data center (UDC). A provisionable data center allows a centralization of information technology (IT) services and enterprise-wide, and even internet-wide, access to specialized data and functions. The various moves to re-centralize IT systems of all kinds are driven in part by shortages in IT staff and by the intrinsic inefficiencies of distributed systems. Notably, many IT managers are migrating to a smaller number of large data centers. Enabled by abundant and relatively inexpensive network bandwidth, IT services can now be distributed to users globally. The need to nest server-side technology near the client workstation is lessening, which has led to this dramatic change in IT architecture.

This re-centralization requires greater resilience, reliability and security, since a failure of shared resources or a loss of critical data can affect an enterprise using a provisionable data center to a large degree. At the same time, though, consolidated provisionable data centers can more easily be engineered to eliminate single points of failure.

Another trend is the growing importance of third-party service providers. Networking enterprises are finding it advantageous to turn to service providers instead of bearing the cost of internal development, deployment, and maintenance of their own in-house systems. In areas such as global networking, service providers dominate in provisioning a commodity resource that enterprises could never develop individually. Storage service providers allow enterprises to cache data conveniently. A small, but growing, contingent of application service providers (ASPs) now are able to operate enterprise software systems. IT service providers are exploiting the opportunity to consolidate across enterprises, which allows them to be highly competitive with internal IT organizations.

The system management tools available to reliably operate and secure the resultant necessarily complex network systems are also emerging. Constant, dynamic, reprovisioning of resources to match shifting clients and client needs depends on a strong IT resource management foundation.

Even more than earlier distributed networks, provisionable data center networks are exposed to possible security lapse and even attack through the multitudinous communications links such systems entail. Because there is necessary communication within and between resources contained within the provisionable data center, as well as communication with users outside the network, the possible avenues of security failure are many.

In addition to the "normal" hacker attack, security breaches can consist of such things as the unauthorized entry into a portion of a database by an otherwise authorized user or the unauthorized use of an application managed by the center. An example of this could be use by a foreign engineering entity of a supercomputer computational fluid dynamics facility, perhaps barred by technology exchange law, wherein the foreign entity's use of other portions of the same provisionable data center is legitimate and desirable.

Another example involves a case wherein there are competing clients legitimately served by the UDC and who share some of the available resources, such as a marketing database. These same two clients may also employ the UDC for secure archiving of proprietary data that neither wants the other to access. Furthermore, the management system of a provisionable data center itself could be the target of a focused intrusion whose goal could be the weakening of the management structure to enable other intrusions.

What is needed, then, is a system and an architecture to provide intrusion detection in the provisionable utility data center such that the management components of the data center can be protected from intrusions that originate from either an external source, such as a public facing internet/virtual private network (VPN), resources provisioned by the data center, or the systems within a less trusted part of the data center's management infrastructure.

SUMMARY OF THE INVENTION

Accordingly, the present invention provides a method for employing both network and host intrusion detection probes in a provisionable data center, hereafter called a utility data center (UDC), such that the management components of the data center are protected from intrusions that originate from either an external source, such as the public facing internet/VPN Network, the managed resources that are provisioned by the UDC, or the systems within a less trusted part of the UDC management infrastructure.

Disclosed is a system for protecting security of a provisionable network, comprising: a network server, a network client communicatively coupled with the server, a pool of resources coupled with the server for employment by the client, a resource management system for managing the resources, and an intrusion detection system enabled to detect and respond to an intrusion in said network.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation of this invention can be best visualized by reference to the drawings.

DETAILED DESCRIPTION

The following descriptions of specific embodiments of the present invention have been selected for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

This application incorporates herein by reference the co-pending patent application, application No. 10/349,423, entitled "A Method For Protecting Security Of Network Intrusion Detection Sensors," filed concurrently herewith on Jan.21,2003, and assigned to the assignee of the present application.

Figure 1:
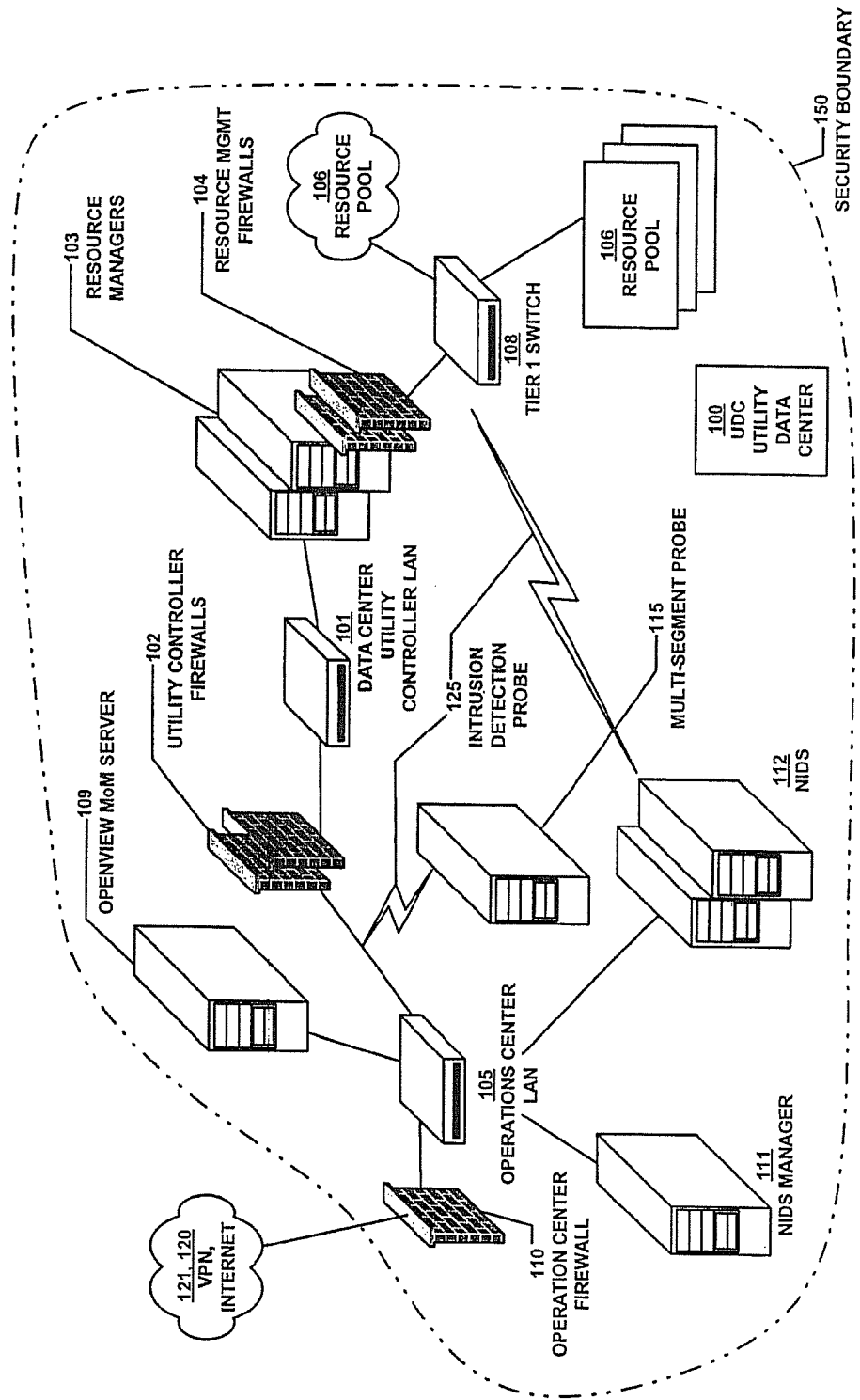
FIG. 1 illustrates a utility data center in accordance with embodiments of the present invention.

FIG. 1 illustrates a deployable network intrusion detection system 112 with probes in a typical provisionable network or utility data center (UDC). Provisional network or utility data center (UDC) 100 is shown bounded by a virtual security boundary 150. Boundary 150 is shown here only to help illuminate the concepts presented herein. Typical UDC 100 comprises an operations center local area network (LAN) 105, a data center utility controller LAN 101 and resource pools 106. It is noted here that, by their very nature, UDCs are flexible in their composition, comprising any number and type of devices and systems. It is the flexibility from which they derive their usefulness. The specific architecture illustrated in FIG. 1, therefore, is not meant to limit the application of embodiments of the present invention to any particular provisionable network architecture.

Typical UDC 100, in this illustration, communicates with the outside world via the Internet 120 and virtual private network (VPN) 121. The communications links that enable this communication are protected by firewall 110. Firewall 100 is shown to illustrate a concept and is not meant to imply any particular method or system of intrusion protection. Many types of hardware and software firewalls are well known in the art and firewall 110 may be either or both.

It is noted here that, in typical UDC 100, there are three "trust domains;" LANs or subsystems that are accessible to and operated by differing levels of system management. The significance of the distinction in trust level attached to each trust domain will become clearer in subsequent discussion. The level of trust, in embodiments of the present invention, can be established in a trust hierarchy.

Firewall 110 divides an overall trust domain, the UDC, from the outside world indicated by internet 120 and VPN 121. Operations center (OC) LAN 105 comprises an internal trust domain. Included in OC LAN 105 are manager-of-managers (MoM) server 109, network intrusion detection system (NIDS) 112, NIDS manager 111 and multi-segment probes 115. It is noted that, though NIDS 112, NIDS manager 111 and multi-segment probes 115 are illustrated as computer-like devices, their physical existence is not limited to a particular device. Each may exist as a standalone device or implemented as software resident in a physical device or server. Intrusion detection probes 125 are illustrated as actions, rather than any form of device.

The heart of a UDC is the data center utility controller (UC) LAN, 101. This LAN represents another, higher, internal trust domain. UC LAN communicates through OC LAN 105 and is typically separated from it by various forms of firewalls 102. UC LAN 101 can comprise various numbers of resource managers, such as illustrated at 103. The flexibility inherent in the UDC concept can result in many combinations of resources and resource managers. Resource managers 103 are the typical interface with the various pools of resources 106, communicating with them through some sort of switching network as indicated by the tier 1 switch at 108.

Resource pools 106 are limitlessly flexible, comprising any conceivable combination of data servers, computational capability, load balancing servers or any other device or capability imaginable. Because the possible varieties of resources that can be included in resource pools 106, they are separated from UC LAN 101 by firewalls 104, which, like UC firewalls 102, can be software or hardware or both, in many combinations.

It is noted again that virtual security boundary 150 does not exist in a physical sense. Resources included in resource pools 106 may include devices and servers located at distance from the other elements of the UDC 100.

NIDS 112 communicates directly with the OC LAN 105. Intrusion detection probes 125 are deployed in the UDC 100 such that the management components of the UDC 100 are protected from intrusions that originate from either an external source, such as the public facing Internet/VPN 120/121, the managed resources, 106, that are provisioned by the UDC 100, or the systems within the less trusted part of the UDC management infrastructure.

This embodiment of the present invention distinguishes between three trust domains established in a trust hierarchy:

1. The Operations Center (OC) LAN- 105 where non-critical UDC and other Operations related functions reside. The level of trust is less than the Data Center Control LAN 101.

2. The Data Center Control LAN 101 where tasks relating to the automated provisioning of managed resources 106 reside. Access to the Data Center LAN 101 is severely restricted.

3. The Managed Resources LANs where the managed resources 106 reside. These LANs are typically not trusted.

It is noted here that clients of the UDC originate outside the trust structure and access elements of the UDC via the Internet or a virtual private network (VPN) resident in the Internet infrastructure.

As shown in FIG. 1, NIDS probes 125 are deployed around the firewalls 102 and 104 that provide ingress/egress to the Data Center Controller LAN 101. Probes 125 are also deployed around the Resource Managers 103 that act as a gateway between the Managed Resources and the Data Center Controller LAN 101.

The probes 125 send alert messages to the NIDS Manager 111. As part of the initiated response to an alert message, the NIDS Manager 111 is configured to raise or lower the priority of each alert depending upon the both the probe that detected the alert and, the type of alert that was detected.

The NIDS Manager 111 in turn sends its highest priority alerts to an alert monitor located in the Operations Center LAN 105. Not shown in FIG. 1, but present on each computer system in the Operations Center 105 and Data Center Controller LANs 101, is host intrusion detection system (HIDS) software.

The HIDS is tuned, or configured, to the functions provided by each system to minimize the number of false intrusion alerts. Alerts are sent to the event monitor residing in the Operations Center 105. Alerts are also sent to a HIDS manager that resides on the same systems as the event monitor.

The event monitor, resident in OC 105, captures events from both the HIDS and NIDS and from the firewall 110 deployed between the Operations Center and the External VPN or Internet. An optional NIDS probe or set of probes can be deployed between this firewall 110 and the Operations Center LAN 105. The event monitor may reduce and correlate events from both the HIDS and NIDS.

Each of the systems in this embodiment of the present invention, and the NIDS probes, have their software operating system protected by "lock-down" software such that they are rendered more difficult to gain unauthorized access to. The lock-down software configuration is tailored to the individual systems.

Embodiments of the present invention allow a convenient management device in that HIDS and NIDS events and alerts for UDC 100 are displayed in a single browser available to UDC management.

HIDS and NIDS configurations are customizable for a UDC. The embodiment of the present invention discussed here integrates technology provided from data communications switch vendors, data communications firewall vendors, network intrusion detection software vendors, host intrusion detection software vendors, and operating system lockdown software. Both HIDS and NIDS are provided for a UDC.

Figure 2:
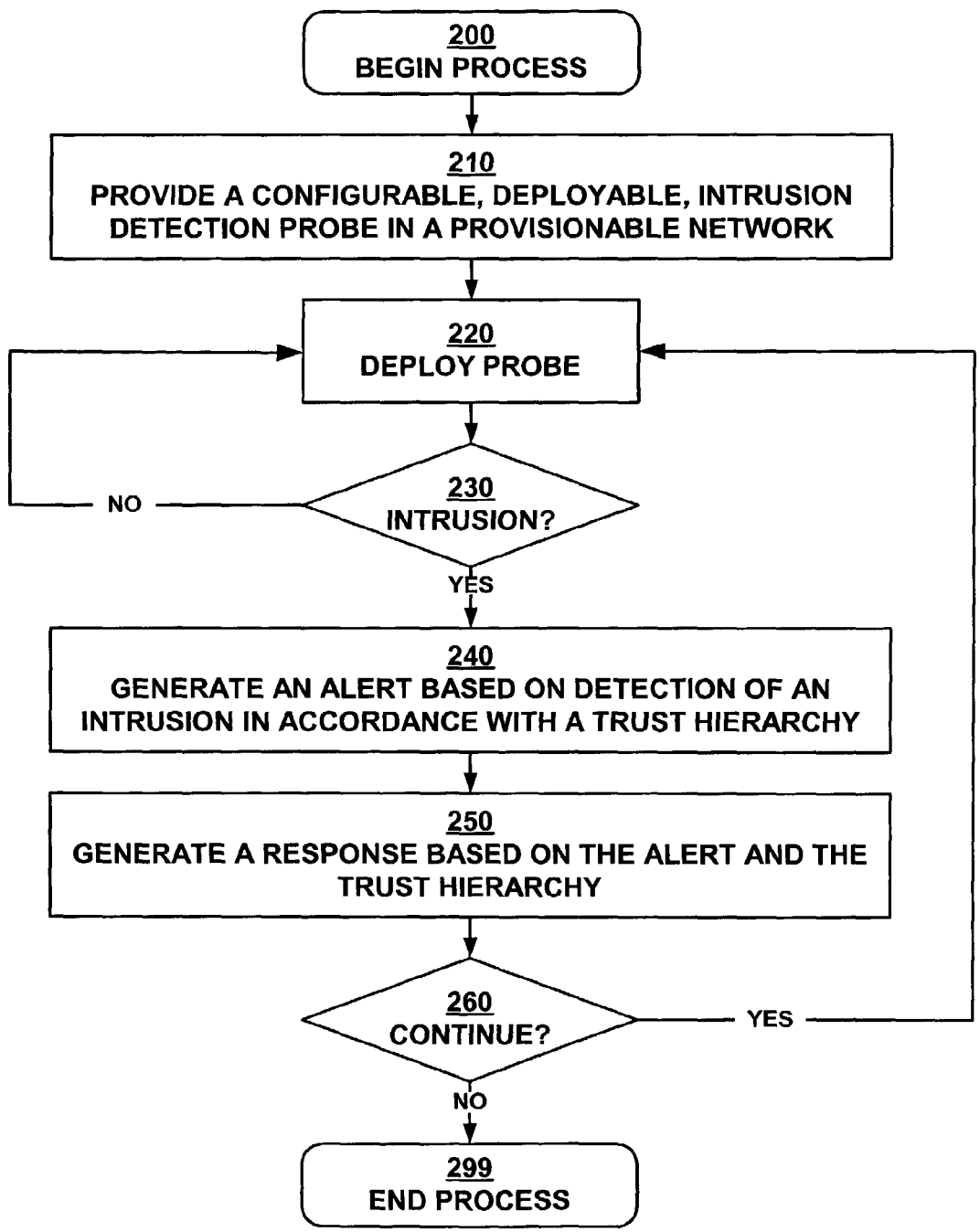
FIG. 2 illustrates block flow diagram in accordance with embodiments of the present invention.

The operation of an embodiment of the present invention is illustrated in FIG. 2, in block flow form. Process 200 commences with providing a configurable, deployable, intrusion detection probe in a provisionable network such as a UDC, 210. A probe is deployed, 220, and if an intrusion is detected at 230, an alert is generated, at 240, in accordance with the type of intrusion and to the area in which the intrusion is detected. The area of detection is rated in accordance with a trust hierarchy.

At step 250, a response is initiated to the alert. The response can be of any number of possible responses. In the embodiment of the present invention discussed here, the alert can range from a flag raised to the attention of system management to a hard lockout of the source and location of the intrusion. Again, the level of response generated is determined by level and source of the alert and the trust level determined from a trust hierarchy of the area, or trust domain, in which the intrusion is detected. The embodiment illustrated here continues its intrusion detection monitoring, as illustrated by 260, until halted, 299.

Figure 3:
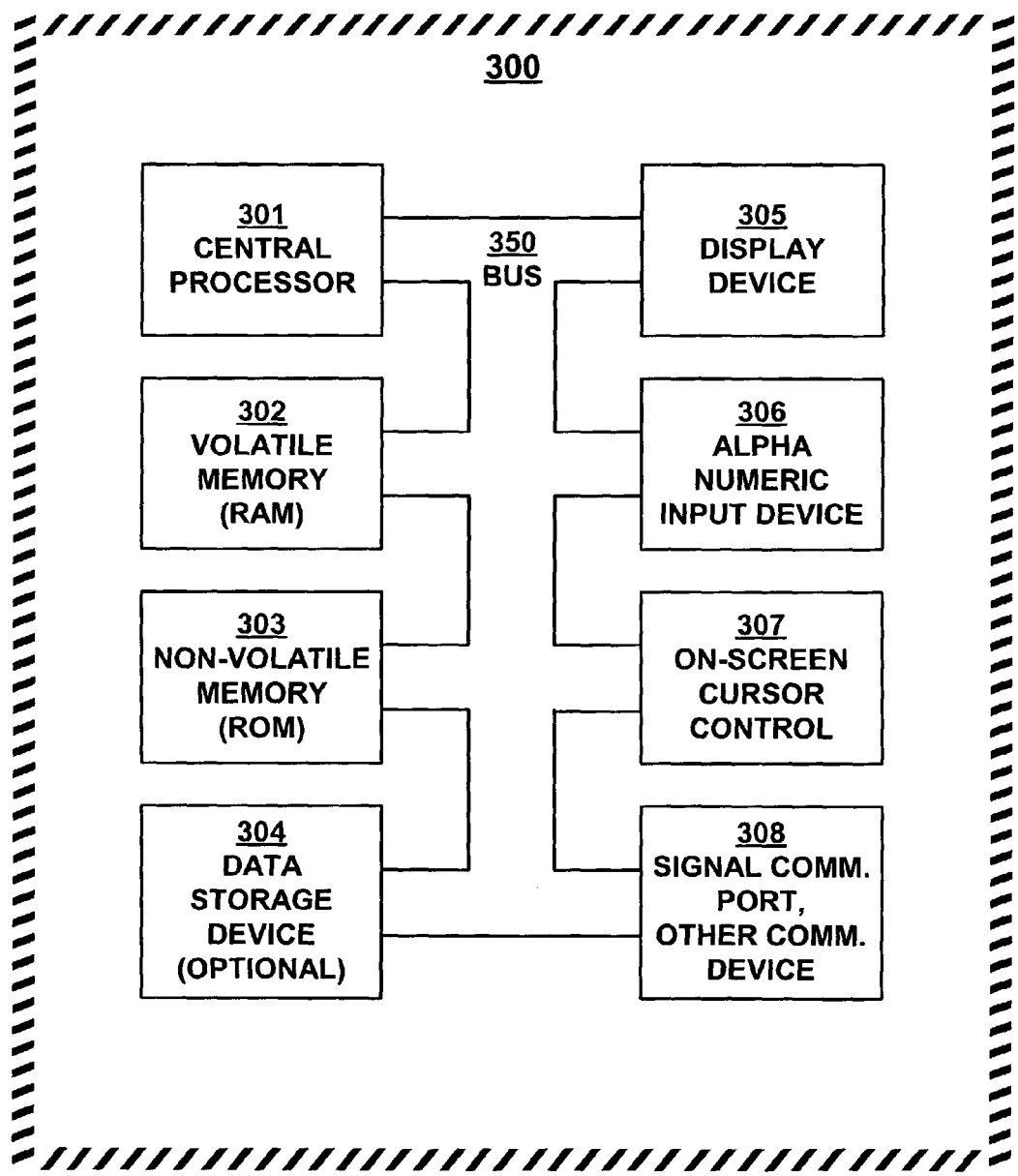
FIG. 3 illustrates a block diagram overview of generic computer system in accordance with embodiments of the present invention.

The software components of embodiments of the present invention run on computers. A configuration typical to a generic computer system is illustrated, in block diagram form, in FIG. 3. Generic computer 300 is characterized by a processor 301, connected electronically by a bus 350 to a volatile memory 302, a non-volatile memory 303, possibly some form of data storage device 304 and a display device 305. It is noted that display device 305 can be implemented in different forms. While a video CRT or LCD screen is common, this embodiment can be implemented with other devices or possibly none. System management is able, with this embodiment of the present invention, to determine the actual location of the means of output of alert flags and the location is not limited to the physical device in which this embodiment of the present invention is resident.

Similarly connected via bus 350 are a possible alpha-numeric input device 306, cursor control 307, and communication I/O device 308. An alpha-numeric input device 306 may be implemented as any number of possible devices, but is commonly implemented as a keyboard. However, embodiments of the present invention can operate in systems wherein intrusion detection is located remotely from a system management device, obviating the need for a directly connected display device and for an alpha-numeric input device. Similarly, the employment of cursor control 307 is predicated on the use of a graphic display device, 305. Communication I/O device 308 can be implemented as a wide range of possible devices, including a serial connection, USB(Universal Serial Bus), an infrared transceiver, a network adapter or an RF (Radio Frequency) transceiver.

The configuration of the devices in which this embodiment of the present invention is resident can vary without effect on the concepts presented here. The flexibility of the UDC concept provides a limitless variety of possible hardware device and inter-linking combinations in which embodiments of the present invention are able to provided.

This description of embodiments of the present invention presents a method for employing both network and host intrusion detection probes in a provisionable data center, also known as a utility data center (UDC), such that the management components of the data center are protected from intrusions that originate from either an external source, such as the public facing internet/VPN, the managed resources that are provisioned by the UDC, or the systems within a less trusted part of the UDC management infrastructure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for providing security in a provisionable network, said method comprising:
   providing an intrusion detection probe which is deployable in said provisionable network, said intrusion detection probe configured to detect an intrusion in said provisionable network, wherein said provisionable network provides dynamic reprovisioning of resources to match shifting clients and needs of said clients;
   generating an alert based on detection of said intrusion in said provisionable network, said alert generated in accordance with a trust hierarchy that includes a first trust domain for an operations center local area network, a second trust domain for a data center control local area network, and a third trust domain for a managed resource local area network, wherein said second trust domain has a highest level of trust and said third trust domain has a lowest level of trust; and
   generating a response based on said alert and said trust hierarchy, wherein said response has a response level that is determined, at least in part, based on a level of trust of a trust domain in which said intrusion was detected, wherein said generating of said response comprises initiating a lockout.

2. The method described in claim 1 wherein said provisionable network comprises a utility data center.

3. The method described in claim 1 wherein said provisionable network comprises a resource pool.

4. The method described in claim 1 wherein said provisionable network comprises a resource manager.

5. The method described in claim 1 wherein said provisionable network comprises a network intrusion detection system.

6. The method described in claim 5, wherein said providing a deployable intrusion detection probe is accomplished in said network intrusion detection system.

7. The method described in claim 5, wherein said generating an alert based on said detection of said intrusion is accomplished in said network intrusion detection system.

8. The method described in claim 1, wherein said response comprises a system lockout.

9. The method described in claim 1, wherein said response comprises a device lockout.

10. The method described in claim 1 wherein said intrusion comprises use by an unauthorized user.

11. The method described in claim 1 wherein said intrusion comprises unauthorized use by an authorized user.

12. The method described in claim 1 wherein said intrusion originates within said provisional network.

13. The method described in claim 1, wherein said generating of said response is preformed by software that resides in a network device.

14. A network intrusion detection system enabled to deploy an intrusion detection probe, comprising:

intrusion detection software resident in a network device, said device communicatively coupled with a provisionable network, which provides dynamic reprovisioning of resources to match shifting clients and needs of said clients;

a trust hierarchy enabled to communicate with said software and to cause evaluation of a detected intrusion; wherein said trust hierarchy includes a first trust domain for an operations center local area network, a second trust domain for a data center control local area network, and a third trust domain for a managed resource local area network, wherein said second trust domain has a highest level of trust and said third trust domain has a lowest level of trust; and a network device enabled to generate a response to a detected intrusion, wherein said response has a response level that is determined, at least in part, based on a level of trust of a trust domain in which said detected intrusion, wherein said generating of said response comprising initiating a lockout.

15. The network intrusion detection system described in claim 14 wherein said provisionable network comprises a utility data center.

16. The network intrusion detection system described in claim 14 wherein said provisionable network comprises a resource pool.

17. The network intrusion detection system described in claim 14 wherein said provisionable network comprises a resource manager.

18. The network intrusion detection system described in claim 14 wherein said provisionable network comprises a network intrusion detection system.

19. The network intrusion detection system described in claim 14 wherein said providing a deployable intrusion detection probe is accomplished in said network intrusion detection system.

20. The network intrusion detection system described in claim 14 wherein said generating an alert based on said detection of said intrusion is accomplished in said network intrusion detection system.

21. The network intrusion detection system described in claim 14 wherein said trust hierarchy is configurable.

22. The network intrusion detection system described in claim 14 wherein said response comprises a system lockout.

* * * * *

UNITED STATES PATENT AND TRADEMARK OFFICE
CERTIFICATE OF CORRECTION

PATENT NO.        : 8,533,828 B2
APPLICATION NO.   : 10/349385
DATED             : September 10, 2013
INVENTOR(S)       : John Mendonca et al.

Page 1 of 1

It is certified that error appears in the above-identified patent and that said Letters Patent is hereby corrected as shown below:

In the Specification

In column 3, line 25, delete "Jan.21,2003," and insert -- Jan. 21, 2003, --, therefor.

In column 3, line 62, delete "probes" and insert -- probe --, therefor.

In column 3, line 64, delete "probes" and insert -- probe --, therefor.

In the Claims

In column 7, line 22, in Claim 12, delete "provisional" and insert -- provisionable --, therefor.

In column 7, line 24, in Claim 13, delete "preformed" and insert -- performed --, therefor.

In column 7, line 34, in Claim 14, delete "intrusion;" and insert -- intrusion, --, therefor.

In column 8, lines 10-11, in Claim 14, delete "comprising" and insert -- comprises --, therefor.

Signed and Sealed this
Twelfth Day of November, 2013

Teresa Stanek Rea
*Deputy Director of the United States Patent and Trademark Office*